May 29, 1962 J. VERDERBER 3,036,555

QUICK ACTING CLAMPING DEVICE

Original Filed April 1, 1958 5 Sheets-Sheet 1

INVENTOR.

JOSEPH VERDERBER

BY Isler & Ornstein

ATTORNEYS

May 29, 1962 J. VERDERBER 3,036,555

QUICK ACTING CLAMPING DEVICE

Original Filed April 1, 1958 5 Sheets-Sheet 2

INVENTOR.
JOSEPH VERDERBER
BY Isler & Ornstein
ATTORNEYS

May 29, 1962 J. VERDERBER 3,036,555

QUICK ACTING CLAMPING DEVICE

Original Filed April 1, 1958 5 Sheets-Sheet 3

INVENTOR.
JOSEPH VERDERBER
BY Isler & Ornstein
ATTORNEYS

INVENTOR.
JOSEPH VERDERBER
BY Isler & Ornstein
ATTORNEYS

INVENTOR.
JOSEPH VERDERBER
BY Isler & Ornstein
ATTORNEYS

United States Patent Office 3,036,555

Patented May 29, 1962

3,036,555

QUICK ACTING CLAMPING DEVICE

Joseph Verderber, 15255 Lake Shore Blvd., Cleveland, Ohio

Continuation of abandoned application Ser. No. 725,695, Apr. 1, 1958. This application Nov. 25, 1960, Ser. No. 71,830

4 Claims. (Cl. 121—38)

This invention contemplates a quick-acting clamping device which, in addition to utilizing a compressed fluid, such as air, as an actuating medium, also employs a pair of movable plungers as clamping members. Devices of this general type, but employing fixed pistons, are described, for example, in my U.S. Patent No. 2,663,339.

A primary object of the invention is to provide an efficient clamping device, all of the parts of which are readily removable for repair or replacement purposes, and which consists of a minimum number of operating parts.

Another object of the invention is to provide a device of the character described, in which the clamping and unclamping stresses are evenly and uniformly distributed, and a highly efficient action of the parts is obtained.

A further object of the invention is to provide a device of the character described, in which means are provided for increasing the area of certain operating parts, so as to facilitate movement of these parts.

Other objects and advantages of my invention will be apparent during the course of the following description.

In the accompanying drawings forming a part of this specification, and in which like numerals are employed to designate like parts throughout the same, FIG. 1 is a top plan view of the clamping device;

Figures 1, 2:
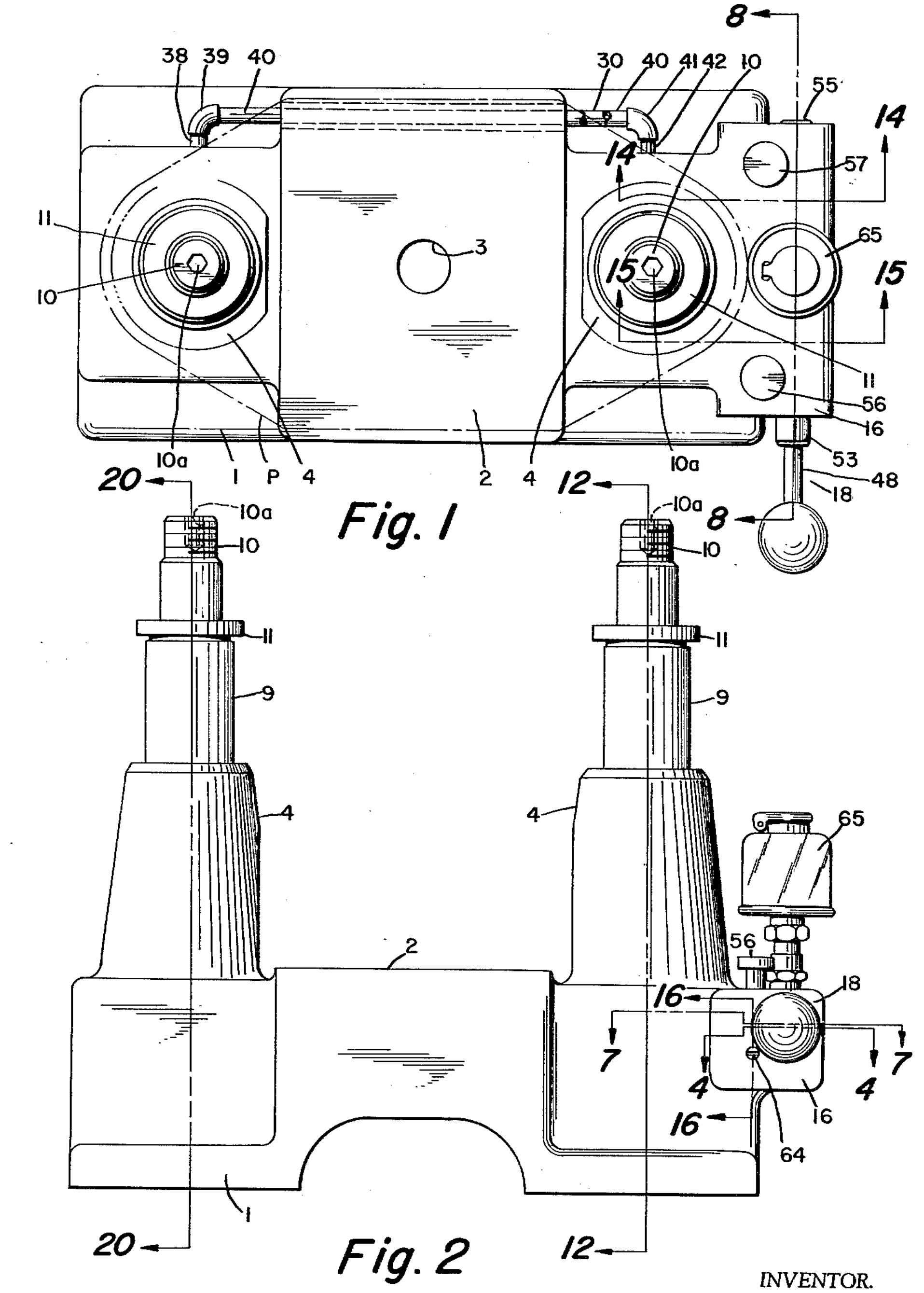
FIG. 2 is a front elevational view of the device.

Referring more particularly to FIGS. 1 to 21 inclusive of the drawings, the clamping device is seen to comprise a rigid cast iron base 1 having a raised portion or pad 2 formed integrally therewith, which pad has a drill clearance hole 3 extending vertically therethrough.

Projecting vertically upwardly from the base 1 and integral therewith are a pair of cylindrical standards 4 having a longitudinal bore 5 extending completely therethrough. The bore 5 is counterbored as at 6 to provide a cylinder and the bore 6 is further counterbored, as at 7, for the reception of a cap 8, which closes the lower end of the cylinder 6, and is removably secured to the base 1.

Slidably mounted in the bore 5 of each standard 4 is a plunger 9 having a threaded stud 10 projecting upwardly from its upper end. These plungers are adapted to support a clamping plate or top plate of suitable size and form. Such a top plate is indicated in FIG. 1 in broken lines, and is designated by the reference character P. The plungers 9 have flanges 11 on which the top plate P can rest and against which the plate can be secured by means of suitable nuts secured to the studs 10, as is well known to those skilled in this art. The studs 10 are provided in their upper ends with hex holes 10*a*, so that an Allen wrench may be used in these holes to prevent rotation of the plungers 9 while the nuts are being tightened.

Each of the plungers 9 is provided at its lower end with a threaded stud 12, to which a piston head 13 is secured, as by means of a nut 14. The heads 13 are movable in the cylinders 6, between the extreme positions shown in solid and broken lines in FIG. 12, and each piston head is provided with a piston ring 15.

For the purpose of admitting air, under pressure, into the cylinders 6, for the purpose of actuating the piston heads 13, the base 1 is provided with an extension 16 which is provided with a multiplicity of passageways.

These passageways include a horizontal bore or cylinder 17, in which a control valve, generally designated by reference numeral 18, is mounted for slidable movement. The function of this valve will be described after all of the air passageways have been described.

Extending parallel with and below the bore 17 is an air inlet passageway 19, which communicates with the bore 17 through a port 20. Extending horizontally from the bore 17 is a passageway 21, which communicates with a vertical passageway 22, which communicates with one end 23, of an arcuate passageway 24, in the cap 8 (see FIGS. 13 and 14). Extending radially inwardly from the center of the arcuate passagew y 24 is a passageway 25, which communicates with the lower end of the cylinder 6.

Extending vertically from the other end 26 of the passageway 24 is a passageway 27 (FIGS. 12 and 14), the upper end of which communicates with a conduit 28, connected, as by an elbow 29 to a conduit 30 which extends through the rear portion of the pad 2. The conduit 30 is connected, as by an elbow 31 (FIG. 20) to a conduit 32 which communicates with a vertical passageway 33 which terminates at one end 34 of an arcuate passageway 35 in the cap 8 which underlies the cylinder 6, which is at the left in FIGS. 1 and 2. Extending radially inwardly from the center of the arcuate passageway 35 is a passageway 36 which communicates with the lower end of the cylinder 6.

A passageway 37 extends from the upper end of the cylinder 6 and communicates with a conduit 38, connected, as by an elbow 39, to a conduit 40 which extends through the rear portion of the pad 2. The conduit 40 is connected, as by an elbow 41, to a conduit 42, which communicates with a passageway 43 extending to the upper end of the cylinder 6 at the right in FIGS. 1 and 2.

A passageway 44 extends from the cylinder 6 (FIG. 15) to the bore 17. A passageway 45 extends from the bore 17 to an air exhaust passageway 46, which extends generally parallel with the air inlet passageway 19, but in laterally spaced relation to the bore 17.

Another passageway 47 extends from the bore 17 to the air exhaust passageway 46.

Figures 3, 4, 5, 6, 7, 8, 9, 10:
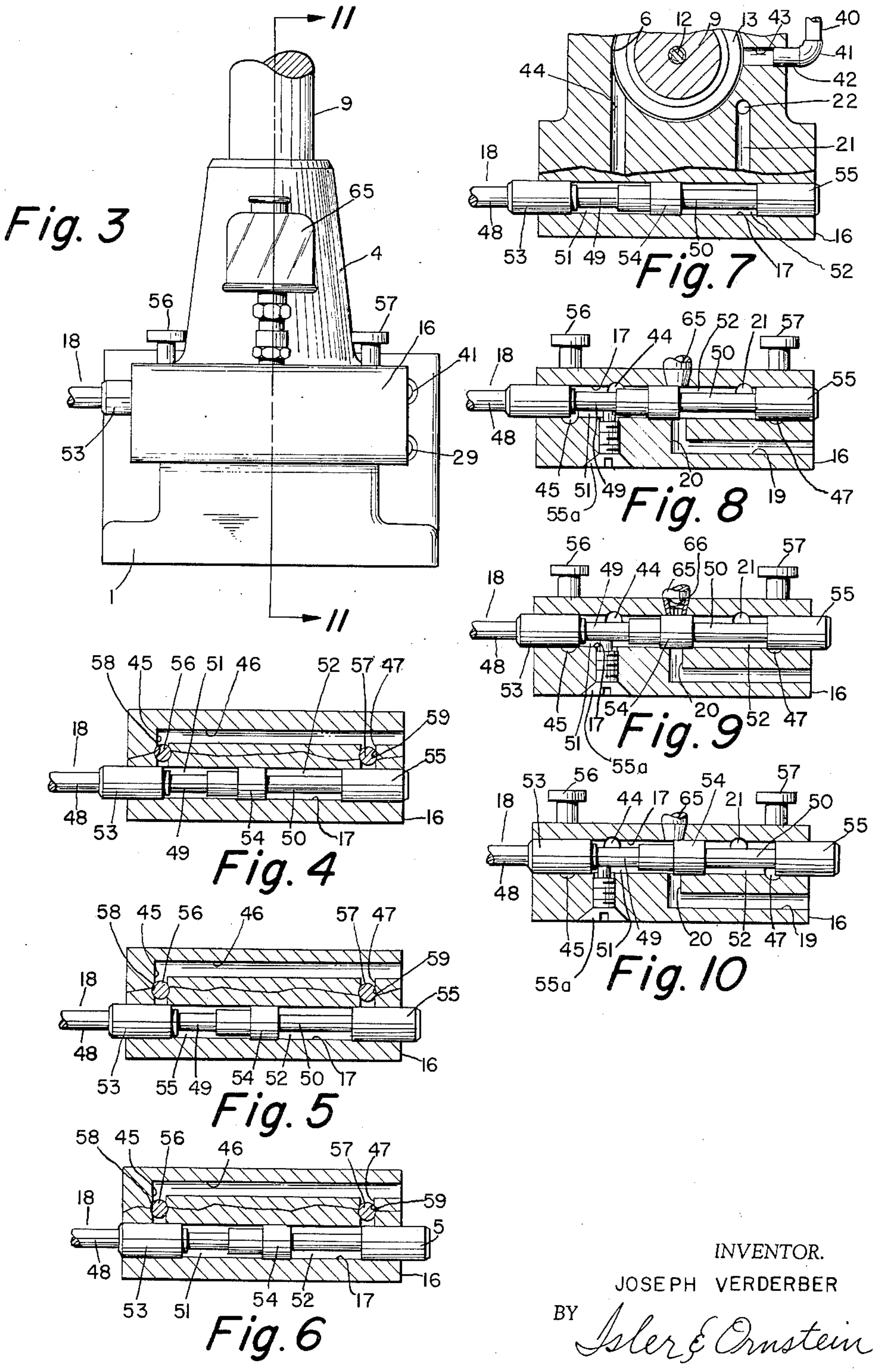
FIG. 3 is an end or side elevational view of the device, as viewed from the right side of FIG. 2.
FIG. 4 is a fragmentary cross-sectional view, taken on the line 4—4 of FIG. 2.
FIG. 5 is a view similar to FIG. 4, but showing the air control valve in the neutral position.
FIG. 6 is a view similar to FIG. 4, but showing the air control valve in the clamping position.
FIG. 7 is a fragmentary cross-sectional view, taken on the line 7—7 of FIG. 2.
FIG. 8 is a fragmentary cross-sectional view, taken on the line 8—8 of FIG. 1.
FIG. 9 is a view similar to FIG. 8, but showing the air control valve in neutral position.
FIG. 10 is a view similar to FIG. 8, but showing the air control valve in the clamping position.
Figure 11:
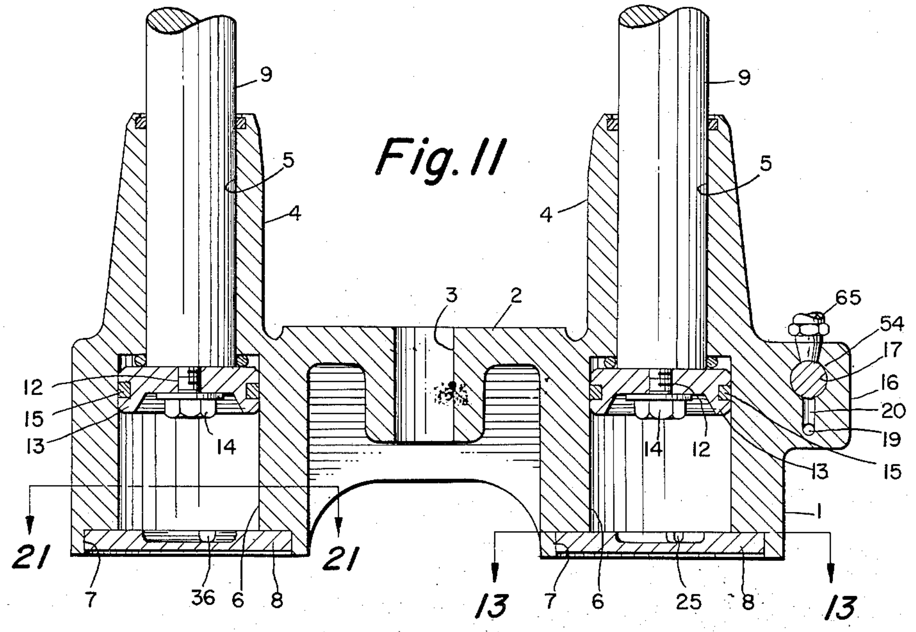
FIG. 11 is a fragmentary cross-sectional view, taken on the line 11—11 of FIG. 3.

The control valve 18, to which reference has been made, includes a valve stem 48 having portions 49 and 50 of reduced diameter, which define annular passageways 51 and 52 respectively within the bore 17. Adjacent the portions 49 and 50 are bearing portions 53, 54 and 55. As shown in FIGS. 8, 9 and 10, a screw 55*a* having a stem extending into the bore 17 is used both as a means of preventing axial displacement of the valve 18 from the bore, and as a means for stopping the valve in its two operative or open positions. The operation of the device may be described as follows:

With the valve stem 48 in the neutral position shown in FIGS. 5 and 9, the valve is closed, since compressed air is prevented from entering the cylinder 17, because air inlet port 20 is blocked by the portion 54 of the valve.

If the valve is moved to the position shown in FIGS. 4 and 8, air flows from passageway 19 through port 20 into annular passageway 52, thence through passageways 21, 22, 24, and 25 into the bottom of the cylinder 6. At the same time, air passes from the passageway 25 through passageway 27, conduit 28, elbow 29, conduit 30, elbow 31, conduit 32, and passageways 33, 35 and 36 into the bottom of the other cylinder 6. The air entering both cylinders 6 simultaneously acts on the piston heads 13 to force the plungers 9 to the position shown in solid lines in FIGS. 11 and 12, thereby releasing or unclamping work which has been clamped to the pad 2 by the top plate P.

Air in the cylinder 6, shown at the left in FIGS. 1 and 2, which is forced out of the cylinder by the upward movement of the piston head 13, passes through passageway 37 (FIG. 20), thence through conduit 38, elbow 39, conduit 40, elbow 41, conduit 42, and passageway 43 into the upper end of the cylinder 6 shown at the right in FIGS. 1 and 2. From this point, it leaves the cylinder and enters passageway 44, and passes through passageways 51 and 45 into exhaust passageway 46. At the same time, the air in the cylinder 6 shown at the right in FIGS. 1 and 2, which is forced out of the cylinder by the upward movement of the piston head 13, leaves the cylinder and enters passageway 44, and passes through passageways 51 and 45 into the exhaust passageway 46.

If the valve stem 48 is moved to the position shown in FIGS. 6 and 10, air flows from passageway 19 through port 20 into annular passageway 51, thence through passageway 44 into the top of the cylinder 6 shown at the right in FIGS. 1 and 2. At the same time, air passes into the passageway 43, thence through conduit 42, elbow 41, conduit 40, elbow 39, conduit 38 and passageway 37 into the top of the cylinder 6 shown at the left in FIGS. 1 and 2. The air entering both cylinders 6 simultaneously acts on the piston heads 13 to force the plungers 9 to the position shown in broken lines in FIG. 12, thereby causing the top plate P to clamp work to the pad 2.

Air in the cylinder 6 shown at the left in FIGS. 1 and 2, which is forced out of the cylinder by the downward movement of the piston head 13, passes through passageways 36, 35, 33, conduit 32, elbow 31, conduit 30, elbow 29, conduit 28, passageways 27, 24, 22, 21, 52 and 47, into exhaust passageway 46. At the same time, the air in the cylinder 6, shown at the right in FIGS. 1 and 2, which is forced out of the cylinder by the downward movement of the piston head, leaves the cylinder and enters passageway 25, and passes through passageways 24, 22, 21, 52 and 47, into exhaust passageway 46.

The exhaust air, issuing from passageway 46 may be muffled as by means of a muffler (not shown), which is described in my U.S. Patent No. 2,913,941.

Means have also been provided for controlling the speed of movements of the plungers 9, and thereby the speed of the clamping and unclamping action. Such means is best illustrated in FIGS. 1 to 6, 8 to 10, and 14 to 19 of the drawings, and comprises valves 56 and 57 which are disposed in vertical bores 58 and 59 respectively of the extension 16. These valves are provided with passageways 60 extending diametrically therethrough, which passageways are adapted to be aligned with the passageways 45 and 47 (see FIG. 18), and when thus aligned, the maximum volume of air passes through the passageways 45 and 47, and a maximum speed of movement of the plungers 9 is effected.

Figure 19:
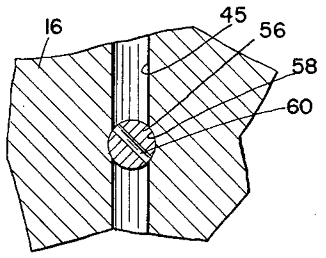
FIG. 19 is a view similar to FIG. 18, but showing the air speed control valve in another position.

The valves 56 and 57 may be rotated to the position shown in FIG. 19, in which position, the passageway 60 is partially closed by the wall of the bores 58 or 59, so that a lesser volume of air is permitted to pass through the passageways 45 or 47, and a half speed of movement of the plungers 9 is effected.

Figure 16:
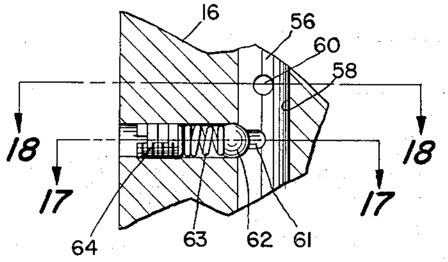
FIG. 16 is a fragmentary cross-sectional view, taken on the line 16—16 of FIG. 2.
Figure 18:
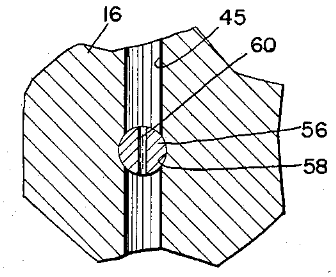
FIG. 18 is a fragmentary cross-sectional view, taken on the line 18—18 of FIG. 16.
Figure 17:
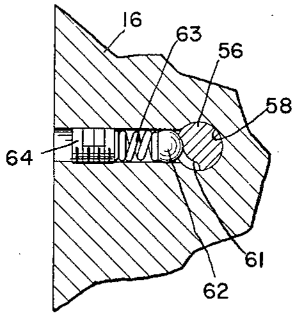
FIG. 17 is a fragmentary cross-sectional view, taken on the line 17—17 of FIG. 16.

For the purpose of maintaining the valves 56 and 57 in proper axial position and against axial displacement, these valves are provided with arcuate recesses or grooves 61, as best shown in FIGS. 16 and 17, and a ball 62 is resiliently urged into this recess, as by means of a compression coil spring 63, retained against the bass by a set screw 64. The ends of the recess 61 form stops which, when engaged by the ball 62, determines the two positions of the valves 56 or 57, which are shown in FIGS. 18 and 19.

Means have also been provided for automatically lubricating the bore 17 as well as the walls of the cylinders 6, so that the parts which are movable in the bore and cylinders are movable in a frictionless manner, thereby greatly facilitating the speed of operation of the device.

For this purpose, a wick feed oiler 65 is provided, which is mounted on the extension 16, and supplies oil to the bore 17 through a spring-pressed check valve 66 (FIG. 9), this valve communicating with the bore 17 at a point directly above the port 20, as best shown in FIG. 9.

Each time that air is admitted into the port 20, the ball of the check valve 66 is moved and oil is sucked into the bore 17, becoming atomized by the air, so as to cause it to coat the walls of the bores and cylinders to which reference has been made. At the conclusion of the air-admitting operation, the check valve will automatically close, so that oil is not wasted by gravity flow. This method of lubricating the parts is not only automatic, but highly efficient and inexpensive.

Figure 22:
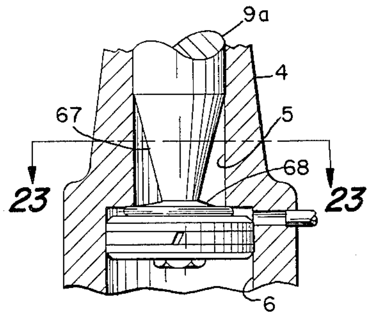
FIG. 22 is a fragmentary cross-sectional view, similar to FIG. 11, but showing a modification of the plunger.
Figure 23:
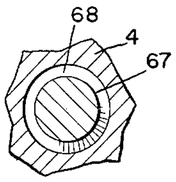
FIG. 23 is a cross-sectional view, taken on the line 23—23 of FIG. 22.

In FIGS. 22 and 23, a modification of the plunger 9 is shown, in which the plunger 9*a* is provided with a conical lower end 67, and a base having a conical surface 68. By removing a portion of the lower end of the plunger 9*a*, in this manner, the weight of the plunger is decreased to some extent, thus facilitating the lifting of the plunger to its unclamped position. At the same time, frictional resistance of the wall of the cylinder 5 to movement of the plunger 9*a* is reduced to some extent, thus further facilitating movement of the plunger.

Figure 24:
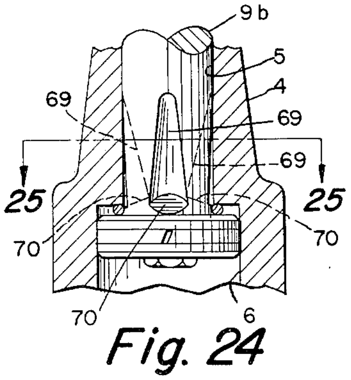
FIG. 24 is a view similar to FIG. 22, but showing another modification of the plunger.
Figure 25:
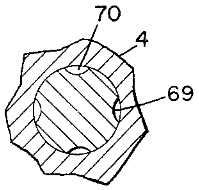
FIG. 25 is a cross-sectional view, taken on the line 25—25 of FIG. 24.

In FIGS. 24 and 25, another modification of the plunger 9 is shown, in which the plunger 9*b* is provided at its lower end with circumferentially-spaced recesses having inclined walls 69 of arcuate cross-section, and inclined surfaces 70 at the bases of these recesses. By removing portions of the lower end of the plunger **9*b* in this manner, the weight of the plunger is decreased to some extent, thus facilitating the lifting of the plunger to its unclamped position. At the same time, frictional resistance of the wall of the cylinder 5 to movement of the plunger 9*b***, is reduced to some extent, thus further facilitating movement of the plunger.

It is thus seen that I have provided an efficient clamping device, all of the parts of which are readily removable for repair or replacement purposes, and which consists of a minimum number of operating parts.

By employing a double piston arrangement, the clamping and unclamping stresses are evenly and uniformly distributed, and a highly efficient action of the parts is obtained.

The valves for controlling the speed of operation are simple and readily accessible, and are operable by a simple twisting or turning movement.

Figure 12:
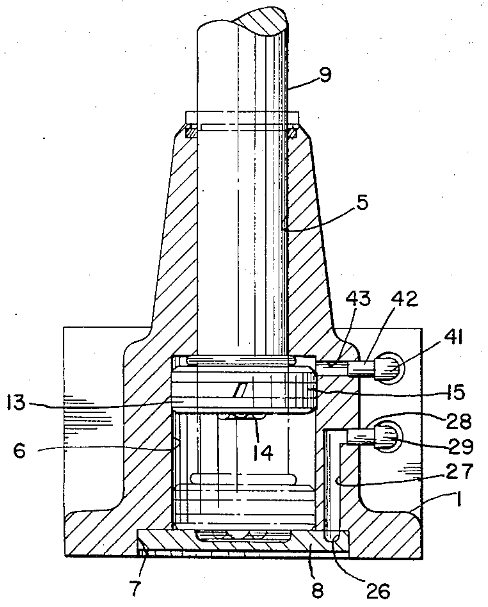
FIG. 12 is a fragmentary cross-sectional view, taken on the line 12—12 of FIG. 2.
Figure 13:
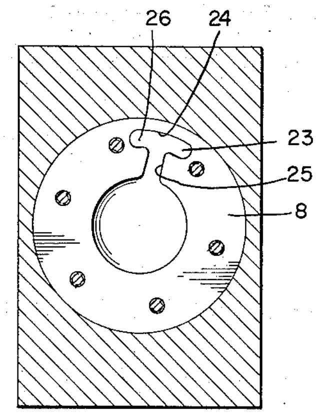
FIG. 13 is a fragmentary cross-sectional view, taken on the line 13—13 of FIG. 11.
Figure 14:
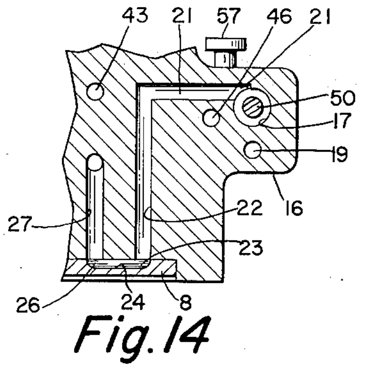
FIG. 14 is a fragmentary cross-sectional view, taken on the line 14—14 of FIG. 1.
Figure 15:
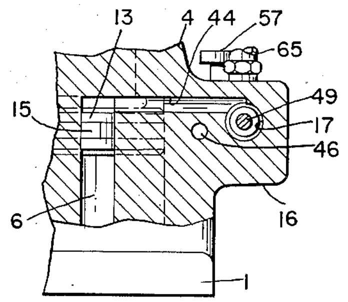
FIG. 15 is a fragmentary cross-sectional view, taken on the line 15—15 of FIG. 1.
Figure 20:
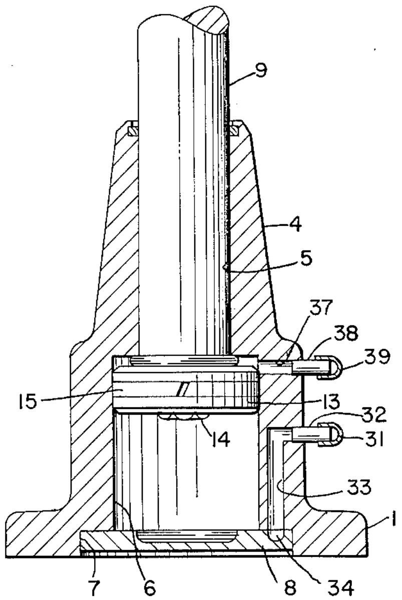
FIG. 20 is a fragmentary cross-sectional view, taken on the line 20—20 of FIG. 2.
Figure 21:
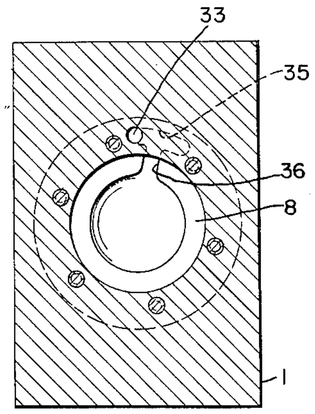
FIG. 21 is a fragmentary cross-sectional view, taken on the line 21—21 of FIG. 11.

The series fluid flow path through the cylinders, best shown in FIGS. 1, 12 and 20, is of extreme importance. The term "sequential," as used herein, accurately describes the flow path, as distinguished from the physical movement of the pistons. The air flow path is sequential, while the air pressure buildup and resultant piston movement is simultaneous. It was heretofore thought that if the flow of air to a pair of cylinders in series was effected or accomplished, that the piston in the remote cylinder would not respond simultaneously with the near cylinder. It was found, however, that the air pressure buildup in both cylinders is simultaneous. This enabled the valve control mechanism to be placed in series with the cylinders, instead of in over-lapping relation with both cylinders, which would have been a distinct disadvantage, because the control mechanism, in such case, would not only have been difficult of access, but, due to its location, would have interfered with the clamping operations of the device, since the valve mechanism would be in the path of movement to the device of articles or work to be clamped. The series arrangement of the cylinders with each other and with the valve control mechanism is therefore of great advantage, from a practical standpoint.

It is to be understood that the form of my invention, herewith shown and described, is to be taken as a preferred example of the same, and that various changes may be made in the shape, size and arrangement of parts of my invention, without departing from the spirit of the invention or the scope of the subjoined claims.

This application is a continuation of my copending application, Serial No. 725,695, filed April 1, 1958, and now abandoned.

Having thus described my invention, I claim:

1. In a clamping device of the character described, a generally horizontal base having an upper surface comprising a work supporting pad portion and laterally extending wing portions, spaced upwardly extending standards on said wing portions, a stepped vertically axised bore extending through each of said wing portions and said standards, each said bore comprising an upper relatively small diameter guide portion within said standard, a cylinder portion of intermediate diameter within said wing portion, and a shallow relatively large diameter cap receiving recess opening through the lower surface of said wing portion and defining an annular shoulder, ducts extending through the respective wing portions of said base and including plural ducts associated with at least one cylinder, each said duct having a portion disposed adjacent of and extending longitudinally to the wall of said cylinder portion, each said duct portion opening into said cap receiving recess through said shoulder, end caps received in said cap receiving recesses, the upper surface of each said end cap having a surface depression of smaller diameter than the diameter of said cylinder portion and disposed subjacently thereto, said upper surface also having plural open grooves including an arcuate open groove underlying said duct openings and a radial open groove interconnecting said depression and said arcuate groove, said arcuate open groove cooperating with said shoulder to define a closed through passageway to conduct fluid to and from other of said cylinders, and said radial open groove cooperating with said shoulder to define a closed branch passageway for the admission and exhaust of fluid to and from said cylinder portion.

2. In the device of claim 1, additional fluid conducting means serially interconnecting said cylinders and including plural ducts extending in part through said wing portions and opening into at least one of said cylinders through at least two coplanar circumferentially spaced openings in the side walls of said cylinder portion adjacent the upper edges thereof.

3. In the device of claim 2, plural ducts extending through said work supporting pad portion of said base, and conduit means interconnecting at least one of said ducts with said first named ducts associated with said cylinders and additional conduit means interconnecting at least one other of said ducts with said additional ducts.

4. In the device of claim 1, ducts extending through said work supporting pad portion of said base, and conduit means interconnecting said ducts with said first named ducts associated with said cylinders to conduct fluid between said cylinders.

References Cited in the file of this patent

UNITED STATES PATENTS

| | | |
|---|---|---|
| 4,765 | Grimshaw | Feb. 20, 1872 |
| 2,070,805 | Peterson | Feb. 16, 1937 |
| 2,167,328 | Beggs | July 25, 1939 |
| 2,373,654 | Beekley et al. | Apr. 17, 1945 |
| 2,663,339 | Verderber | Dec. 22, 1953 |
| 2,678,072 | Verderber | May 11, 1954 |
| 2,738,650 | McAfee | Mar. 20, 1956 |

FOREIGN PATENTS

| | | |
|---|---|---|
| 741,381 | Germany | Nov. 10, 1943 |